US006215547B1

(12) United States Patent
Ramanujan et al.

(10) Patent No.: US 6,215,547 B1
(45) Date of Patent: *Apr. 10, 2001

(54) REFLECTIVE LIQUID CRYSTAL MODULATOR BASED PRINTING SYSTEM

(75) Inventors: Sujatha Ramanujan, Pittsford; David Kessler, Rochester; John F. Carson, West Henrietta, all of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,328

(22) Filed: Nov. 19, 1998

(51) Int. Cl.[7] .............................. G03B 27/32; G03B 27/54
(52) U.S. Cl. ................................................. 355/67; 355/32
(58) Field of Search .................................. 355/38, 45, 67, 355/71, 32; 353/31, 63, 64, 98; 358/302, 471; 347/239, 255, 256; 359/72, 246, 247, 263, 267, 292

(56) References Cited

U.S. PATENT DOCUMENTS

| | | | |
|---|---|---|---|
| 4,728,965 | | 3/1988 | Kessler et al. ................. 347/241 |
| 5,061,049 | | 10/1991 | Hornbeck ......................... 347/241 |
| 5,325,137 | | 6/1994 | Konno et al. ...................... 353/63 |
| 5,327,263 | * | 7/1994 | Katagiri et al. .................. 358/471 |
| 5,461,410 | | 10/1995 | Venkateswar et al. ............ 347/240 |
| 5,461,411 | | 10/1995 | Florence et al. .................. 347/240 |
| 5,475,513 | * | 12/1995 | Nakanishi et al. ................. 359/40 |
| 5,504,514 | | 4/1996 | Nelson ............................. 347/130 |
| 5,521,748 | | 5/1996 | Sarraf .............................. 359/321 |
| 5,552,840 | * | 9/1996 | Ishii et al. ........................ 348/751 |
| 5,621,486 | * | 4/1997 | Doany et al. .................... 348/756 |
| 5,652,661 | | 7/1997 | Gallipeau et al. ............... 358/302 |
| 5,668,611 | | 9/1997 | Ernstoff et al. .................. 348/771 |
| 5,701,185 | | 12/1997 | Reiss et al. ...................... 358/471 |
| 5,721,622 | | 2/1998 | Venkateswar ................... 358/298 |
| 5,743,610 | | 4/1998 | Yajima et al. ..................... 353/31 |
| 5,743,612 | | 4/1998 | Matsuda et al. ................... 353/97 |
| 5,745,156 | | 4/1998 | Federico et al. ................ 347/256 |
| 5,754,217 | | 5/1998 | Allen ............................... 347/239 |
| 5,754,305 | | 5/1998 | DeClerck et al. ............... 358/302 |
| 5,757,348 | * | 5/1998 | Handschy et al. ................ 345/89 |
| 5,805,274 | | 9/1998 | Saita ................................. 355/38 |
| 5,808,800 | * | 9/1998 | Handschy et al. ............... 359/630 |
| 5,851,060 | * | 12/1998 | Uchiyama et al. ................ 353/94 |
| 5,870,164 | * | 2/1999 | Lu et al. .......................... 349/180 |
| 5,883,687 | * | 5/1999 | Lu et al. .......................... 349/201 |
| 5,914,817 | * | 6/1999 | Browning et al. ............... 359/634 |
| 5,936,708 | * | 8/1999 | Saita ................................. 355/20 |
| 5,971,545 | * | 10/1999 | Haitz ................................. 355/31 |

* cited by examiner

Primary Examiner—Russell Adams
Assistant Examiner—Rodney Fuller
(74) Attorney, Agent, or Firm—David A. Novais; Nelson Adrian Blish

(57) ABSTRACT

An apparatus and method of printing two-dimensional swaths of area onto a photosensitive media uses at least one reflective liquid crystal spatial light modulator. In the apparatus and method, illumination optics receive light from a light source and image the light at a polarization beamsplitter element. The polarization beamsplitter element images one polarization state of light at the spatial light modulator to create an essentially telecentric illumination at the spatial light modulator.

31 Claims, 11 Drawing Sheets

REFLECTIVE LIQUID CRYSTAL MODULATOR BASED PRINTING SYSTEM

FIELD OF THE INVENTION

This invention relates generally to an apparatus and method for spatially and temporally modulating a light beam and imaging modulated light onto a photosensitive media.

BACKGROUND OF THE INVENTION

Photographic images are traditionally printed onto photographic paper using conventional film based optical printers. Currently, the photographic industry is converting to digital imaging. One step in the digital imaging process is to utilize images obtained from digital cameras or scanned film exposed in traditional photographic cameras to create digital image files that are then printed onto photographic paper. Towards this end, the current invention relates to the area of digital image printing of digital image files onto photographic paper.

The growth of the digital printing industry has led to multiple approaches to digital printing. One of the first methods of digital printing employed was the use of cathode ray tube (CRT) based printers. While such printers provide a means for digital printing, the technology has several known limitations. The first is the reduced resolution as determined by the limitation of the phosphor and electron beam. The resolution limitation is more severe when printing a large format at high resolution, such as 8 inch by 10 inch photographic prints with resolutions approaching 500 pixels/in.

CRT printers tend to be expensive which is a severe shortcoming in a cost sensitive market. Also, CRT printers are limited in the ability to provide sufficient red exposure to the media when operating at frame rates above 10,000 prints per hour.

Another commonly used approach to digital printing is the laser based engine as shown in U.S. Pat. No. 4,728,965. Such laser based systems are generally polygon based flying spot systems using red, green, and blue lasers. Unfortunately, as with CRT printers, laser based systems tend to be expensive. Specifically, the cost of blue and green lasers remains quite high. Additionally, currently available lasers are not always as compact as would be convenient. Another problem with laser based printing systems is that the photographic paper used for traditional photography is not directly usable in a color laser printer due to reciprocity failure. High intensity reciprocity failure is a phenomena by which photographic paper is less sensitive when exposed to high light intensity for a very short exposure time. Flying spot laser printers expose each of the pixels for a very short time, on the order of a fraction of a microsecond. Optical printing systems expose the paper for the duration of the whole frame time, which can be on the order of seconds. Thus, a special paper is required for laser printers.

A more contemporary approach uses a single spatial light modulator such as a Texas Instruments digital micromirror device (DMD) as shown in U.S. Pat. No. 5,061,049 or liquid crystal device (LCD) modulator to modulate an incoming optical beam. Spatial light modulators provide both significant advantages in cost, allow longer exposure times, and have been proposed for a variety of different printing systems from line printing systems such as the printer depicted in U.S. Pat. No. 5,521,748, to area printing systems such as the system described in U.S. Pat. No. 5,652,661.

The first approach using the Texas Instruments DMD shown in U.S. Pat. No. 5,461,411 offers advantages common to spatial light modulator printing such as longer exposure times using light emitting diodes as a source as shown in U.S. Pat. No. 5,504,514. However, this technology is very specific and not widely available. As a result, DMDs may be expensive and not easily scaleable to higher resolution. The currently available resolution is not sufficient for all printing needs. Furthermore, there is no steady path to increased resolution.

The second approach is to use a liquid crystal spatial light modulator. Liquid crystal modulators are a low cost solution for applications involving spatial light modulators. Several photographic printers using commonly available LCD technology have been proposed. Some examples of such systems are described in U.S. Pat. Nos. 5,652,661; 5,701,185; and 5,745,156. Most designs revolve around the use of a transmissive spatial light modulator such as depicted in U.S. Pat. Nos. 5,652,661 and 5,701,185. Until recently, most spatial light modulators have been designed for use in transmission. While such a method offers several advantages in ease of optical design for printing, there are several drawbacks to the use of conventional transmissive LCD technology. Transmissive spatial light modulators generally have reduced aperture ratios and the use of (thin film transistor) TFT on glass technology does not promote the pixel to pixel uniformity desired in many printing applications. Furthermore, in order to provide large numbers of pixels, many high resolution transmissive LCDs possess footprints of several inches. Such a large footprint can be unwielding when combined with a printlens. As a result, most LCD printers using transmissive technology are constrained to either low resolution or small print sizes. To print high resolution 8 in. by 10 in. images with at least 300 pixels per inch requires 2400 by 3000 pixels. Spatial light modulators with such resolutions are not readily available. Furthermore, each pixel must have a gray scale depth so as to be able to render a continuous tone print and do so uniformly over the frame size Most of the activity in spatial light modulators has been directed at projection display. The projectors are optimized to provide maximum luminous flux to the screen with secondary emphasis placed on contrast and resolution. To achieve the goals of projection display, most optical designs use high intensity lamp light sources. Additionally, many projector designs use three spatial light modulators, one for each of the primary colors, such as the design proposed in U.S. Pat. No. 5,743,610. Three spatial light modulators are both expensive and cumbersome. For projectors using a single spatial light modulator, color sequential operation is required. To maintain the high luminosity in combination with the color sequential requirements, a rotating color filter wheel is employed. This is yet another moving, large part further complicating the system.

An object of the present invention is to overcome the above-mentioned drawbacks of digital image printing on photographic paper, namely cost, resolution, and reciprocity failure. The recent advent of high resolution reflective LCDs with high contrast (greater than 100:1), such as described in U.S. Pat. Nos. 5,325,137 and 5,805,274 has opened possibilities for printing that were previously unavailable. Specifically, the inventive printer is based on a reflective LCD spatial light modulator illuminated sequentially by red, green and blue, light emitting diodes (LEDs), and where the LCD spatial light modulator may be sub-apertured and dithered in two directions, and possibly three to increase the resolution. This method has been applied to transmissive LCD systems due to the already less than perfect fill factor. Incorporating dithering into a reflective LCD printing system would allow high resolution printing while maintaining a small footprint. Also, because of the naturally high fill factor present in many reflective LCD technologies, the dithering can be omitted with no detriment to the continuity of the printed image. While devices such as the TI micromirror can incorporate a secondary mask as shown in U.S. Pat. No. 5,754,217, the mask may be displaced from the device or at the very least add to the processing complexity of an already complex device. The use of a single LCD serves to significantly reduce the cost of the printing system. Furthermore, the use of an area spatial light modulator sets the exposure times at sufficient length to avoid or significantly reduce reciprocity failure.

The progress in the reflective LCD device field made in response to needs of the projection display industry have provided opportunities in printing applications. One aspect of the inventive design is that a LCD designed for projection display can be incorporated into the printing design with little or no modification to the LCD itself. By designing the exposure system and data path such that an existing projection display device requires little or no modification allows inexpensive incorporation of a commodity item into a print engine.

Of the reflective LCD technologies, the most suitable to this design (though not the only reflective LCD) is one which incorporates a small footprint with an integrated CMOS backplane. The compact size along with the uniformity of drive offered by such a device will translate into better image quality than other LCD technologies. There has been progress in the projection display industry towards incorporating a single reflective LCD (see U.S. Pat. No. 5,743,612), primarily because of the lower cost and weight of single device systems. Of the LCD technologies, it is the reflective LCD with the silicon backplane that can best achieve the high speeds required for color sequential operation. While this increased speed may not be as essential to printing as it is for projection display, the higher speeds can be utilized to incorporate additional gray scale and uniformity correction to printing systems.

Spatial light modulator printing systems can incorporate a variety o methods to achieve gray scale. Texas Instruments employs a time delayed integration system that works well with line arrays as shown in U.S. Pat. Nos. 5,721,622 and 5,461,410. While this method can provide adequate gray levels at a reasonable speed, line printing TDI methods can result in registration problems and soft images. Alternate methods have been proposed particularly around transmissive LCDs such as the design presented in U.S. Pat. No. 5,754,305, which can also be incorporated into reflective LCDs. However, if the LCD is sufficiently fast, the proposed printer can create gray scale in area images adequately without time delayed integration or analog operation.

SUMMARY OF THE INVENTION

An object of this invention to provide for a high pixel density color image at a media exposure plane in an AgX printing system; and to provide means by which to utilize a high site density spatial light modulator to create digital images for imaging onto photographic media.

Briefly, according to one aspect of the present invention, light emitting diode sources are imaged color sequentially through a polarizer, spatial uniformizing optics and a polarizing beamsplitter to create essentially telecentric illumination at the plane of a spatial light modulator. The spatial light modulator is comprised of a plurality of modulator sites in two dimensions. Individual modulator sites rotate the polarization state of incoming light and reflected light passes through the polarizing beamsplitter cube. Light is then imaged through a print lens assembly and an additional polarization element onto a media plane. The media is exposed in a color sequential manner with a two dimensional color image. The media is then moved to a second position and a new image is printed.

In one embodiment the light emitting diodes are arranged in a two-dimensional pattern such that light emitted from the sources is largely collected by the imaging optics. The light emitting diodes are then addressed in a series of pulses of varying amplitude and duration, in a color sequential manner to provide illumination of varying light levels to the reflective spatial light modulator, thus extending the gray scale available through the spatial light modulator.

In a further embodiment of the invention, the light emitting diodes and collimating lenses are replaced by a refletorised tungsten-halogen lamp, an infrared-rejecting filter and a color filter wheel with red, green, blue and opaque filter positions.

Incident light passes though individual collimating lenses to a linear polarizer. The linear polarizer serves to establish the polarization axis of the incident light to be the same as the polarizing beamsplitter cube. Light passes through a lenslet array and field lens arrangement to provide uniform and telecentric illumination. Light incident on the polarizing beamsplitter cube is channeled in the direction of the spatial light modulator as the initial polarizer in the optical system established the polarization axis as such.

Uniform light incident on the spatial light modulator is modulated on a site by site basis. Image data is displayed on the spatial light modulator as a series of frames corresponding to the illumination level and color. The voltage supplied to the spatial light modulator may vary with the illumination wavelength. Light rotated by the spatial light modulator is passed through the polarizing beamsplitter cube and through a subsequent polarizer and print lens assembly. The print lens assembly is used in combination with a linear polarizer to provide a high contrast magnified image at the image plane. At the image plane multiple images generated color sequentially are imaged on a two dimensional area or swath on the media. Upon completion of exposure of a given image, the media is advanced and the next image is exposed.

In an alternate embodiment of the invention, the polarizer following the polarizing beamsplitter is rotated to multiple distinct positions to compensate for the difference in rotation between illumination wavelengths.

In a further embodiment of the invention, multiple spatial light modulators are sequentially placed in the illumination path and imaged onto the media. The multiple modulators may be distinct in their operation with respect to wavelength of illumination, drive voltage, or aspect ratio. The spatial light modulators may also incorporate polarization compensators before the polarizing beamsplitter to improve contrast. Additionally, multiple modulators may be needed to switch between differing aspect ratios.

In a further embodiment of the invention, the spatial light modulator or an image thereof is moved to multiple distinct locations displaced at a distance determined by the modulator site size to create multiple images. This approach, referred to as dithering, provides additional resolution at the image plane.

In a further embodiment, the spatial light modulator is comprised of apertured modulator sites that are dithered and imaged to create higher pixel density at the image plane.

In a further embodiment of the present invention, the print lens assembly is replaced by another print lens assembly on command to create a larger area print. The image generated by dithering in combination with the larger image size provides larger prints at high resolution.

The present invention relates to a method of printing onto a photosensitive media using at least one reflective liquid crystal spatial light modulator. The method comprises the steps of: imaging light from a light source at least through an optics assembly; passing the light from the optics assembly through a polarization beamsplitter element to isolate polarization states of the light; directing the polarized light to the spatial light modulator to create an essentially telecentric illumination at the spatial light modulator; and imaging the light through a print lens assembly at the photosensitive media.

The present invention also relates to a printing assembly which prints onto a photosensitive media. The printing assembly comprises a light source; illumination optics which receive light from the light source and image the light at a beamsplitter element which images one polarization state of light at a spatial light modulator, wherein an essentially telecentric illumination is created at the spatial light modulator; and a print lens assembly which images the light onto the photosensitive media.

The above, and other objects, advantages, and novel features of the present invention will become more apparent from the accompanying description thereof when considered in conjunction with the following drawings.

DETAILED DESCRIPTION OF THE INVENTION

The present description will be directed in particular to elements forming part, or in cooperation more directly with an apparatus in accordance with the present invention. It is understood that the elements not shown specifically or described may take various forms well known to those skilled in the art.

Figure 1A:
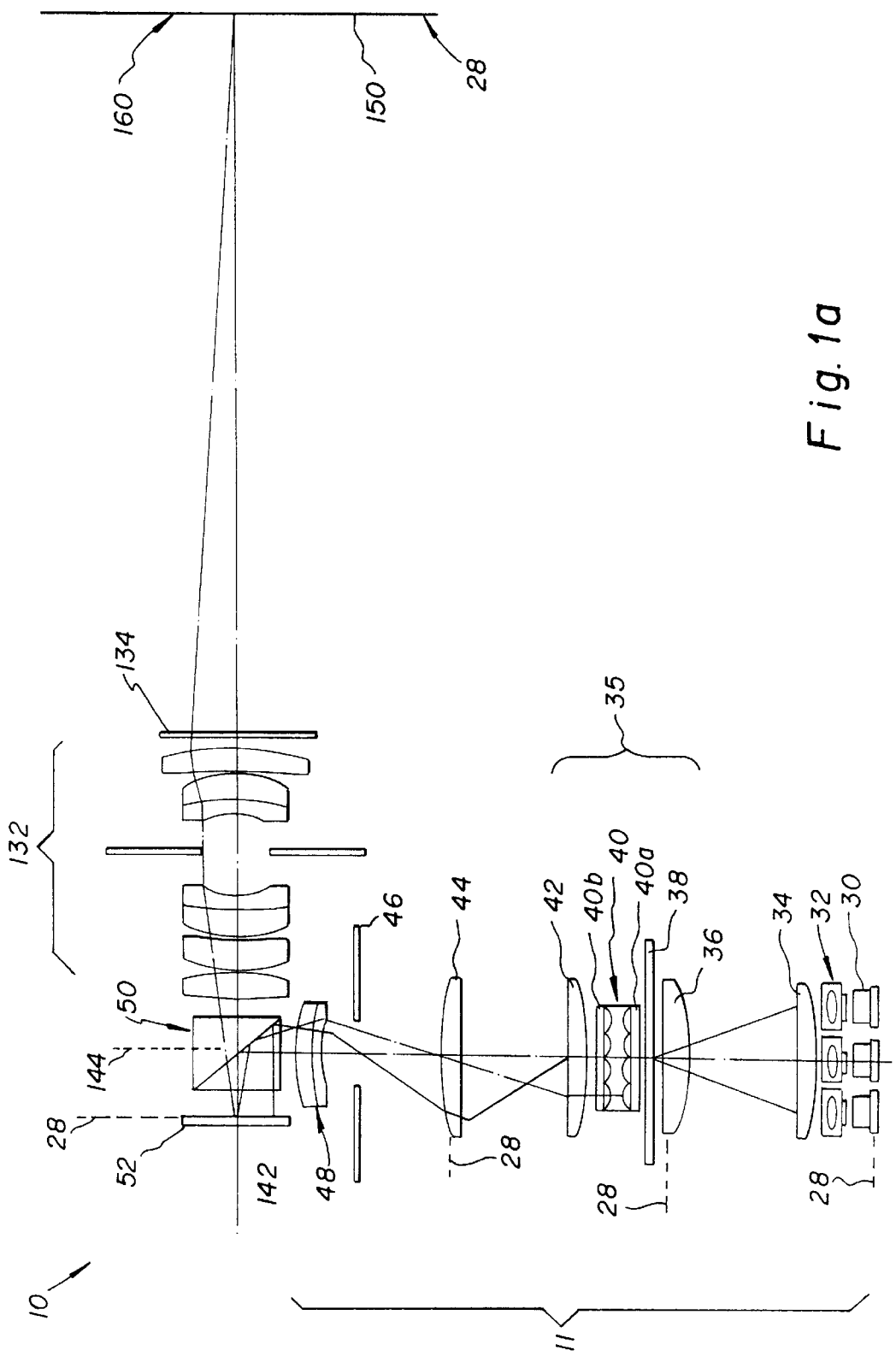
FIG. 1a illustrates a layout of a reflective spatial light modulator based printing system for printing two-dimensional swaths using light emitting diodes.

Referring now to the drawings, wherein like reference numerals represent identical or corresponding parts throughout the several views, FIG. 1a illustrates a printer referred to in general by numeral 10. Printer 10 is comprised of a light source 30 which can be in the form of light emitting diodes (LED); illumination optics 11; a polarization beamsplitter element 50 which can be in the form of a beamsplitting cube; a reflective spatial light modulator 52 in the form of a reflective liquid crystal device(LCD) modulator; a data path (not shown) for providing image information to modulator 52; and a print lens assembly 132. Printer 10 provides a two dimensional image or swaths of area to light sensitive media 160 located at an image plane 150.

Figure 2:
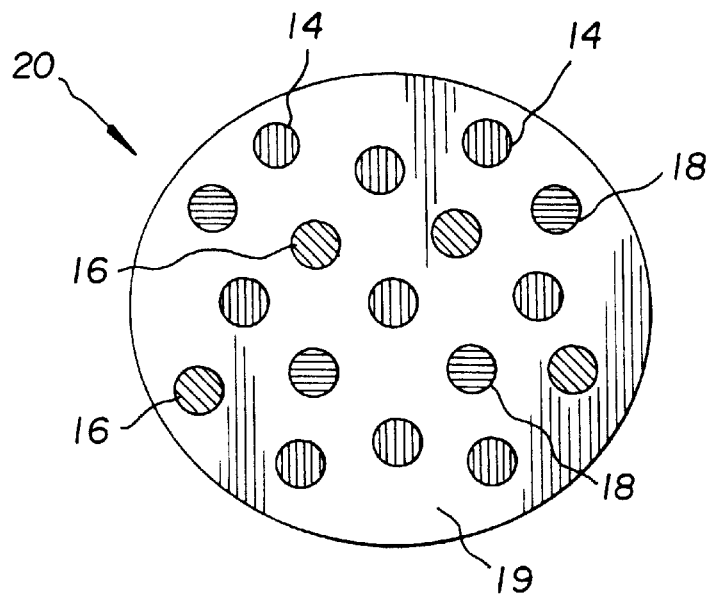
FIG. 2 illustrates a two-dimensional arrangement of light emitting diodes.

Light source 30 comprises a two-dimensional array of LEDs at three distinct wavelengths representing red, blue, and green emission. One arrangement of LEDs of light source 30 is shown in FIG. 2. In FIG. 2, the LEDs of light source 30 are contained in a circular aperture 20. LEDs emitting in the red wavelength 14, LEDS emitting in the blue wavelengths 18, and LEDs emitting in the green wavelength 16, are placed in a frame 19. The LEDs are arranged such that the colors of emission are spread evenly about the aperture. The relative number of LEDs emitting at a given wavelength are determined by the sensitivity of the media onto which the light is imaged. An example arrangement could include four red LEDs 14, two green LEDs 16, and two blue LEDs 18. The LEDs are spaced such that a significant fraction of the light emitted can be captured in the collection aperture of the downstream optics of illumination optics 11. Furthermore, redundancy in emitters reduces the system sensitivity to malfunction in any individual LED. The LEDs of light source 30 are operated in a pulsed and color sequential manner. For any given image, groups of LEDs are activated in order of wavelength. For example, the LEDs 14 are activated and deactivated, blue LEDs 18 are activated and deactivated, then green LEDs 16 are activated and deactivated. Any activation cycle for a given wavelength consists of a series of pulses, which may vary in duration or amplitude. The length and duration of the pulses are determined by the level of illumination needed per image to define the gray scale and by the sensitivity of media 160 to light level and illumination time.

Figure 3:
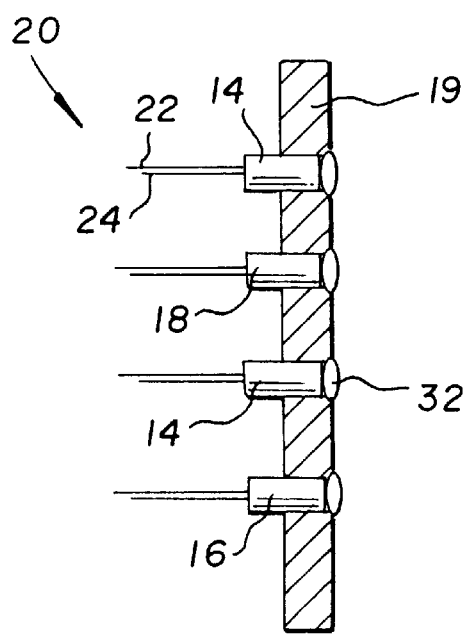
FIG. 3 shows a cross section of an apparatus for holding light emitting diodes and collimating lenses for light emitting diodes.

Each of the LED emitters from light source 30 is mapped by illumination optics 11 to cover the area of LCD modulator 52. illumination optics 11 are designed to provide uniform and essentially telecentric illumination at the modulator plane. This design is unique to printing applications because the requirements for uniformity of illumination and uniformity of image are far more stringent in printing then in projection display. Specifically, the tolerance to roll-off at the edges of the illumination is much greater. The telecentricity is required to maintain the uniformity of the image at the image plane due to constraints on the LCD operation. Throughout the system conjugate planes 28 are shown in FIG. 1a The first element in illumination optics 11 is a collimating lens 32 placed in front of each LED of light source 30. FIG. 3 shows a cross sectional view of red 14, green 16 and blue 18 LEDs mounted with collimating lenses 32 into frame 19. Each LED 14, 16, 18 is mounted in frame 19 with the anode 22 and a cathode 24 leads behind frame 19 and collimating lens 32 in front. The individual collimating lenses 32 are required only if the encapsulation of the diodes is insufficient. The collimating lenses aid in collecting the light from the rapidly diverging light from LEDs 14, 16, 18. The use of collimating lens 32 is optional and dependent on the particular choice of LEDs.

Figure 4:
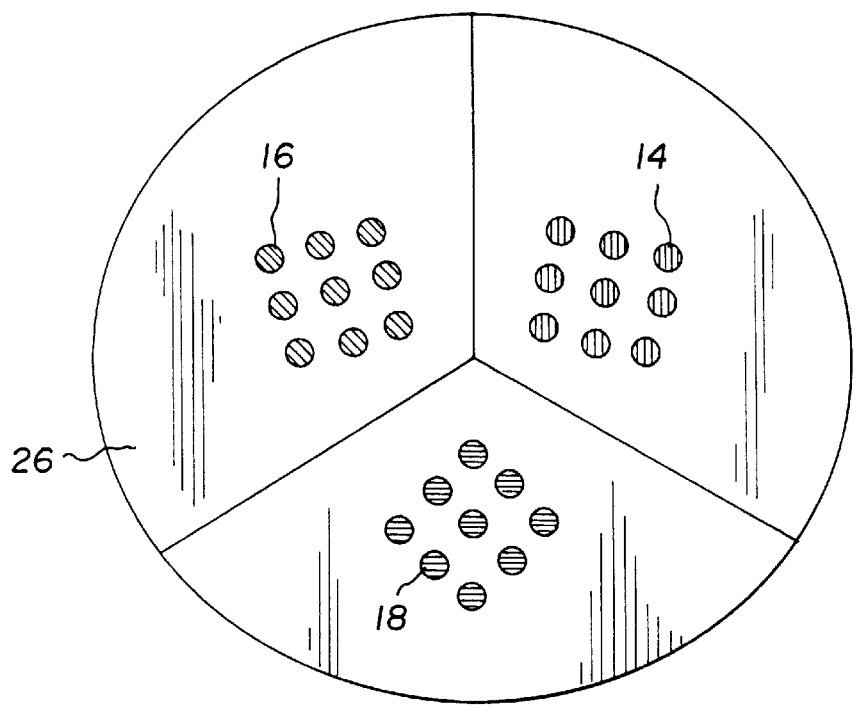
FIG. 4 shows a rotating wheel of light emitting diodes for color sequential illumination.

It should be noted that if the media used requires a great number of LEDs and a single two dimensional arrangement is insufficient to pass enough light through the aperture of the illumination system, a LED wheel as shown in FIG. 4 can be employed. In FIG. 4, LEDs of the three colors, red 14, blue 18, and green 16 are separated into the three segments of a disk assembly 26. Disk assembly 26 rotates the appropriate color LEDs into position and the LEDs are illuminated. Disk assembly 26 spins to three distinct positions for the three distinct colors.

Illumination optics 11 is designed to illuminate a nearly square or rectangular aperture. In general, axially symmetric components are employed in the illumination. Following collimating lens 32 is a combiner field lens 34 that images light to an integrator assembly 35 which comprises two field lenses 36, 42 and a lenslet array assembly 40 which includes two lenslet arrays 40a, 40b. The light at the intermediate illumination plane is broken into a number of portions equivalent to the number of elements in lenslet array 40a. The individual portions are then imaged and magnified by second lenslet array 40b and second field lens 42. Light passing through integrator assembly 35 along with a following field lens 44 is passed through an aperture stop 46 and a relay lens 48. Relay lens 48 is positioned immediately before polarization beamsplitter element 50.

Figure 1B:
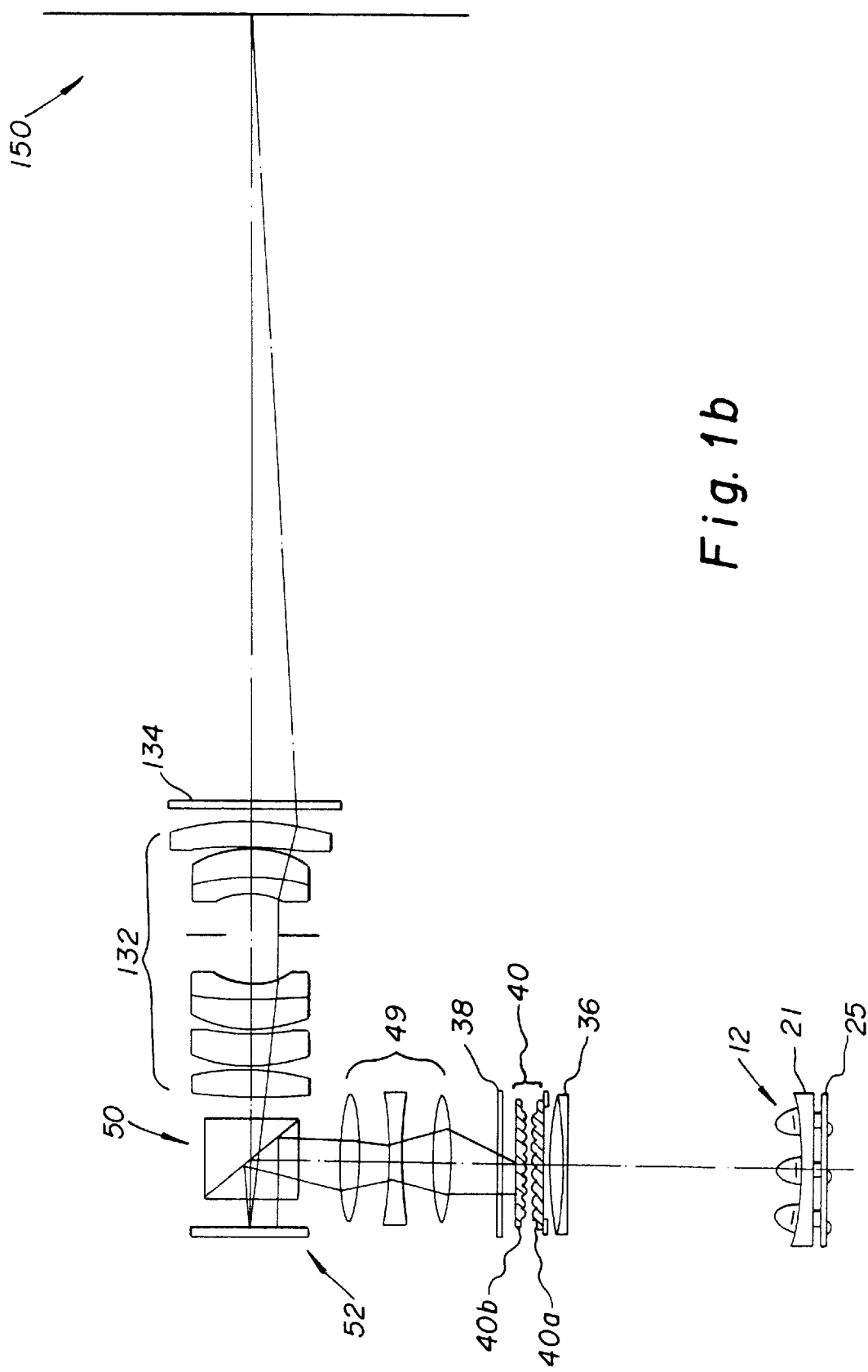
FIG. 1b illustrates a layout of a reflective spatial light modulator based printing system for printing two-dimensional swaths.
Figure 1C:
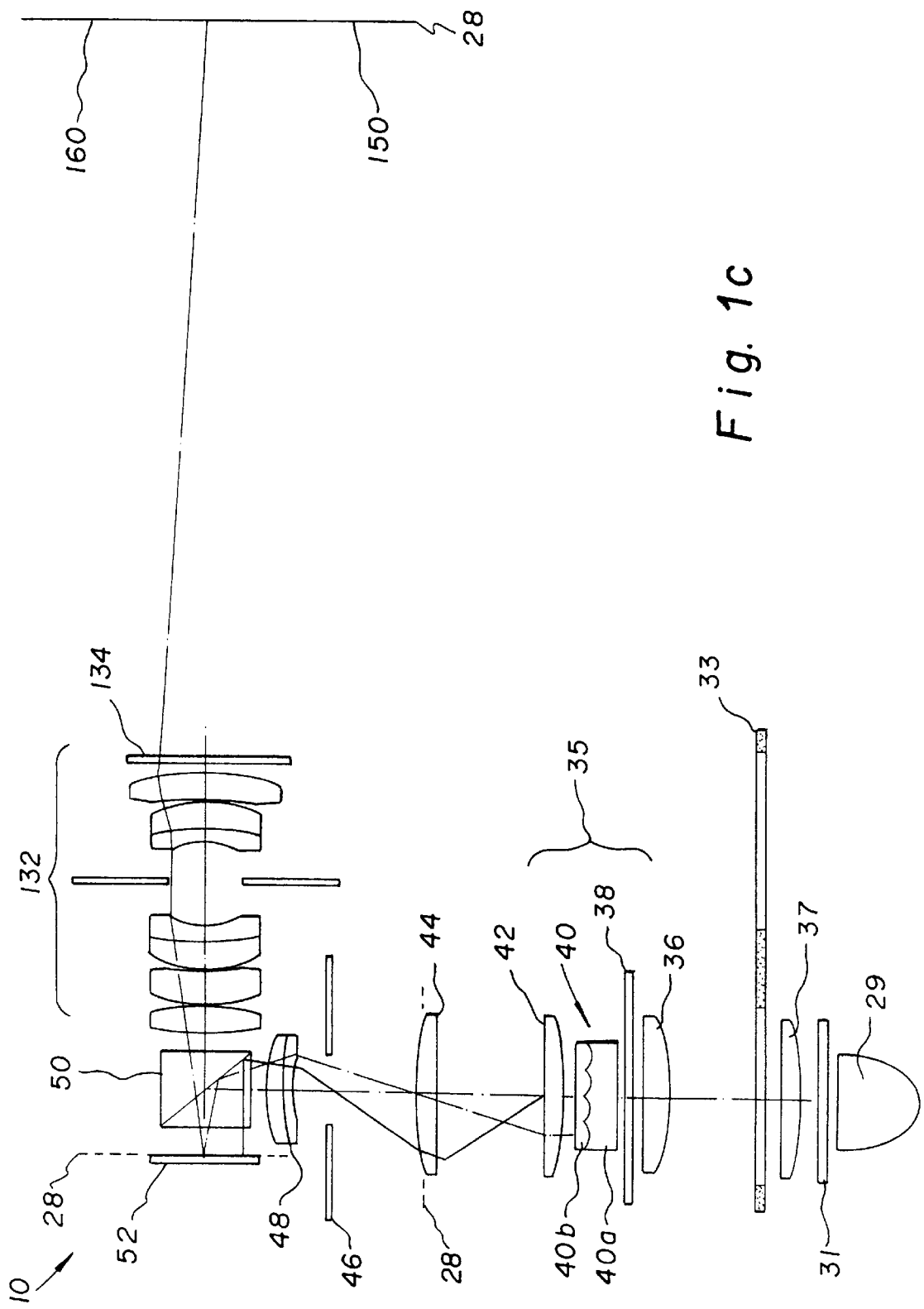
FIG. 1c illustrates a layout of a reflective spatial light modulator based printing system for printing two-dimensional swaths using a halogen lamp.

The LEDs of light source 30, collimating lens 32 and combiner field lens 34 can be replaced by a red, green and blue 2-dimensional array of suitably lensed lamps 12 placed on a spherical surface 21 which is placed on a printed circuit board 25 (FIG. 1b). The center of curvature of spherical surface 21 is at least at the center of collimating lens 32 as shown in FIG. 1b. It should also be noted that, although relay lens 48, field lens 44, and field lens 42 are shown as separate elements in FIG. 1a, a single compound lens 49 providing uniform and essentially telecentric illumination could be employed instead of the three individual elements as is depicted in FIG. 1c.

It should be understood that as an alternative, a light source in the form of a broadband visible source with a color filter wheel can be employed. More specifically, an alternate light source such as a halogen lamp 29 can be employed in conjunction with a color filter wheel 33 to provide the required color sequential illumination. Such an arrangement is shown in FIG. 1c. If a halogen lamp 29 is employed, it is advisable to incorporate an infrared rejecting filter 31 following the lamp in the assembly. The reflector present in the housing of a halogen lamp in combination with lenses 36 and 37 direct the flux from the filament into the entrance aperture of lenslet array assembly 40. Rotating color filter wheel 33 separates the illumination in time into red, green and blue spectral bands, and also provides a light blocking position to provide zero illumination blocking intervals. While an illumination incorporating a halogen lamp and filter wheel is adequate, the mechanical motion of the filter wheel adds complexity which may not be desirable.

Because polarization beamsplitter element 50 may not provide adequate extinction between s polarization state of light 142 and p polarization state of light 144, a linear polarizer 38 may be incorporated in the illumination assembly prior to beamsplitter element 50. There are several places where this polarizer 38 can be placed; one such position is immediately preceding lenslet array assembly 40. Linear polarizer 38 is used to isolate the polarization state parallel to the axis of polarization beamsplitter element 50. This serves to reinforce the polarization state determined by polarization beamsplitter element 50, decrease leakage light and increase the resulting contrast ratio. In FIG. 1, light of the s-polarization state 142 passing through polarization beamsplitter element 50 is directed to the plane of LCD modulator 52. The p polarization state 144 is passed through beamsplitter element 50.

The light in s polarization state 142 directed onto LCD modulator 52 is essentially telecentric. This a key aspect of this design and sets the design apart from those generally used for projection display. If the light impingent is not telecentric, then modulation across the different angles of incident light is not uniform which will lead to a severe degradation in contrast.

Figure 5A:
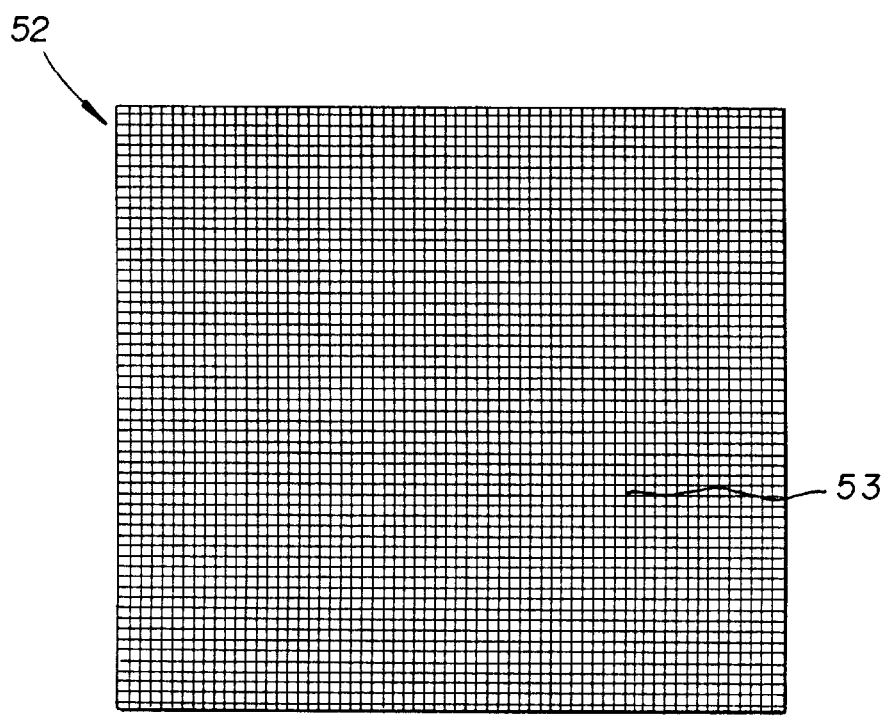
FIG. 5a illustrates a front surface view of a multiple site spatial light modulator.

Spatial light modulator 52 of this system is designed for a two dimensional reflective polarization based spatial light modulator as is shown in FIG. 5a. Modulator 52 includes a plurality of modulator sites 53 that are individually modulatable. Light passes through modulator 52, is reflected off the back of the modulator 52, and returns through modulator 52. If a modulator site 53 is "on" or bright, during the round-trip through modulator 52, the polarization state of the light is rotated. In an ideal case the light is rotated 90 degrees. However, this degree of rotation is rarely easily achieved. If a given modulator site is "off" or dark, the light is not rotated. The light that is not rotated is not passed straight through the beamplitter element 50 but is redirected away from the media plane by beamsplitter element 50. It should be noted that light which is rotated by LCD modulator 52 may become elliptically polarized. Upon passing through a linear polarizer, the light will regain linearity. However, light that is not passed through a linear polarizer will retain ellipticity.

The most readily available choice of reflective polarization based modulators is the reflective liquid crystal modulator. Such modulators, originally developed for use in projection display, can have resolutions as high as 4000× 2000 modulator sites. Currently, resolutions of 1200×1600 sites are available with footprints as small as a 0.9 in diagonal. These high resolution reflective LCDs, are often twisted nematic LCDs, or homeotropically aligned reflective LCDs, although other types of reflective LCDs such as ferroelectric are often employed in projection display. Some of the key characteristics of these LCDs are the high resolution, the high contrast (>100:1) in all three primary colors, the fast frame rate of 70 frames per second or higher, and the high aperture ratio (>90%). In addition, the incorporation of CMOS backplane increases the uniformity across the array. The LCDs are also capable of producing an eight bit gray scale either through pulse width modulation or through analog operation. In either case data may be introduced digitally to the printing system. These characteristics ensure that the reflective LCD is an excellent choice for use in a reflective printing system.

Modulator 52 can be designed in a number of different configurations. The most amenable to a low cost printing system is a single chip system used in color sequential mode. Such a modulator may be either specifically designed for color sequential use, often incorporating a faster backplane and slightly different liquid crystal compositions, or can be a single chip with a 60 to 70 frame per second backplane. The latter option is sufficient for printing because the high frame rates are not a necessity and often reduce the bit depth of the resulting image. However, while many liquid crystals are the same basic crystal for all three primary color wavelengths, sometimes either due to the specific applied voltage or the liquid crystal thickness, operation may differ in the three wavelengths. Specifically, for a given liquid crystal composition, depth and applied voltage, the resulting polarization rotation on an incident beam may vary with wavelength. The efficiency and contrast of the modulation will vary among the three colors. This optical system is designed to image and pass rotated light. However, the degree of rotation will vary as a function of wavelength. In the bright, or "on" state, this difference in rotation will effect the efficiency of the system. In other words, the percentage of incident light that is actually rotated and imaged on the media plane will vary. This difference in wavelength efficiency can be accounted for by varying the illumination strength, and exposure time. Also, the media requires different power densities in the different wavelengths. The bigger problems arise in the dark or "off state". In this state, the light is not rotated and should not be directed thought the cube and imaged. If the light is in fact, rotated, light will leak through the imaging system and decrease the contrast.

It may be that the variations are acceptable and can be compensated for in the illumination, and media. However, if the discrepancy is too great, a number of remedies an be applied.

Figure 5B:
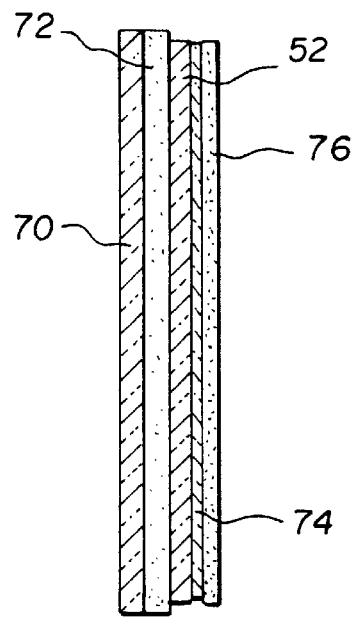
FIG. 5b shows a cross-section of a reflective modulator with motion controllers, a liquid crystal spatial light modulator, a cover glass, and a polarization compensation component.

An alternate embodiment by which contrast can be adjusted is to use polarization compensation or selection devices. A polarization compensator 76 may be introduced to the surface of modulator 52. Such an arrangement is depicted in FIG. 5b. FIG. 5b is a cross-sectional view of modulator 52. As shown in FIG. 5b, the top surface or layer includes compensator 76, the second surface or layer is a cover glass 74 of modulator 52, the third layer is modulator 52 with a reflective backplane, and behind modulator 52 are mounted actuators 70, 72 or mounts for actuators to position modulator 52. Another possibility, is to incorporate a polarization compensator in the path of the optical beam to correct the polarization state of the light. A single compensator may be placed in the optical path to particularly correct the off state of the light. However, if the design is to be truly efficient for each wavelength, the system would require three compensators placed sequentially with the illumination timing.

Polarization compensation devices can prove to be expensive, and an efficient but inexpensive means to accomplish the same results can be obtained through the use of linear polarizers. As was mentioned earlier, a single LCD operating in color sequential mode imparts different degrees of polarization rotation to the three colors of illumination. In an effort to maximize contrast, special care must be taken to provide a truly dark "off state". Because the rotation of the light of modulator 52 is not always crossed perfectly with beamsplitter element 50 in the off state, additional polarization selection must be incorporated into the optical path. Also, beamsplitter element 50 is not perfect and will leak some amount of appositely polarized light. For these reasons, an additional sheet polarizer is either immediately before or after print lens assembly 132. This additional polarizer serves to reject leakage light that is passed through beamsplitter element 50. Specifically, for a particular LCD modulator, the dark state of the light is actually rotated 7 degrees from the polarization transmitting direction of beamsplitter element 50. To correct this, a second analyzer polarizer 134 is rotated 7 degrees off-axis and the leakage light is suppressed. The particular angle at which polarizer 134 must be placed is a function of the particular reflective LCD chosen for the printing system. A suggested placement of analyzer polarizer 134 is shown in FIG. 1.

In some cases, the residual rotation present in the off-state is quite different for the three wavelengths. The implication is that there is some degree of residual charge or rotation on the LCD in the "off state". While this state is designed not to impart rotation to the incident light, a small degree of rotation and possibly ellipticity is introduced. Because for a specific thickness and voltage the rotation will vary with wavelength, the analyzer polarizer position may be different for the three wavelengths. One method to ensure sufficient contrast is to place three polarizers sequentially in time in the path of the beam, or to rotate the existing polarizer 134 to three distinct positions for the three different illumination wavelengths.

Figure 6:
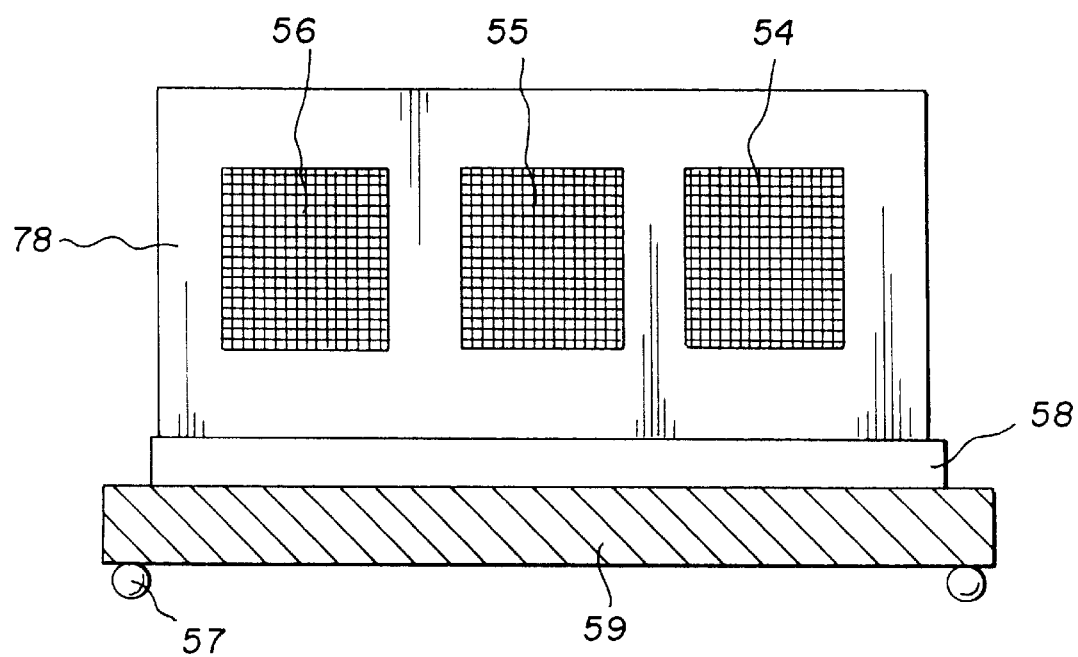
FIG. 6: illustrates a rail arrangement of three spatial light modulator panels for color sequential printing using three distinct modulators.

A further embodiment or approach to dealing with different operation methods for the different wavelength is to use three LCD modulators as shown in FIG. 6. In FIG. 6, three LCD modulators 54, 55, 56 one representing each color are mounted on a single frame 78. Attached to frame 78 is a mount or dither assembly 58 needed for motion in shorter distances in the plane of the LCD modulator. The assembly is attached to a linear translation rail system 59 with bearings 57 used to linearly translate each of the three LCD modulators 54, 55, 56 sequentially in position to utilize the color sequential illumination. It should be understood that methods other than a rail assembly may be used to position the three LCD modulators 54, 55, 56 into position.

The same reasons that may necessitate the use of three LCD modulators are, in part, responsible for the need for telecentric illumination. If the illumination is not telecentric, off axis illumination traverses a different path length through the LCD modulator and acquires a different degree of phase change.

The use of three modulators can add cost and complexity to the systems. It should be possible to use a single LCD modulator to achieve sufficient modulation in all three colors. A simple solution is to adjust the voltage to the LCD modulator as a function of illumination color and as a result alter the rotation seen by each color.

Figure 7:
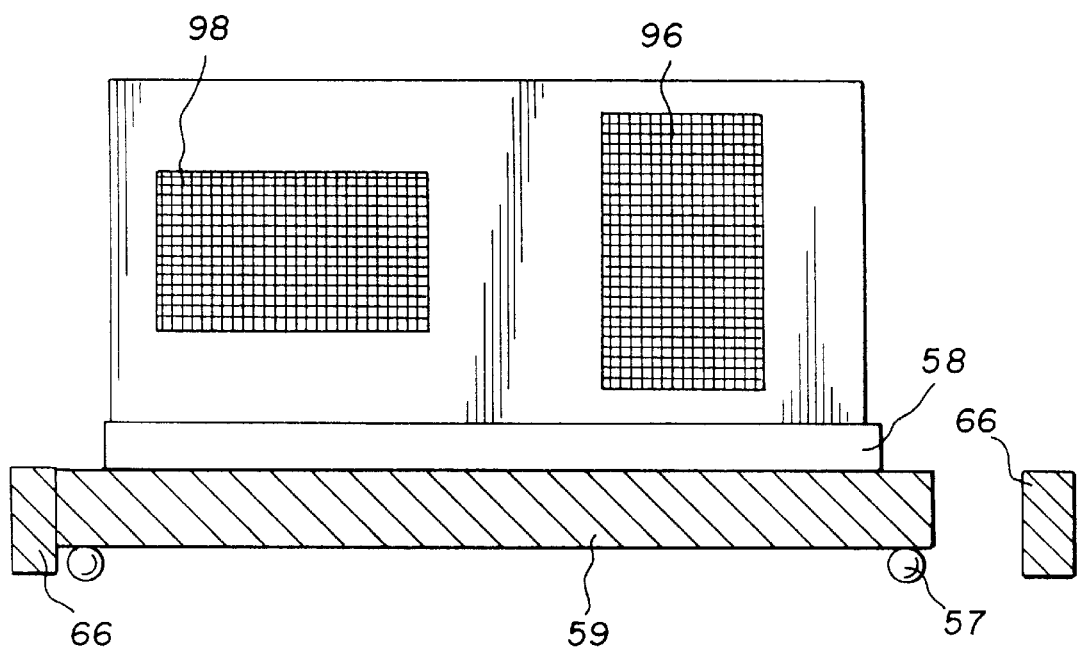
FIG. 7 illustrates a rail arrangement for switching between portrait and landscape positioned spatial light modulators.

In an alternate embodiment it becomes necessary to change the aspect ratio between prints. Instead of using a subsection of the device, it may be necessary to switch between two devices. A switch would be an effort to maintain the resolution. FIG. 7 is a picture of a rail assembly for motion between spatial light modulators of opposite aspect rations. One LCD modulator is in landscape format 98, while the other is in portrait format 96. A single mount or dither assembly 58 is used to hold both LCDs 96, 98 to linear translation rail system 59. This motion assembly is different from the assembly for dithering because the required motion is a greater distance. There are several means by which to translate the assembly, one of which is shown in FIG. 7. LCDs 96, 98 sit on linear translation rail system 59 with ball bearings 57 situated underneath. The assembly is electrostatically or mechanically actuated and moves laterally between two stops 66.

Figure 8:
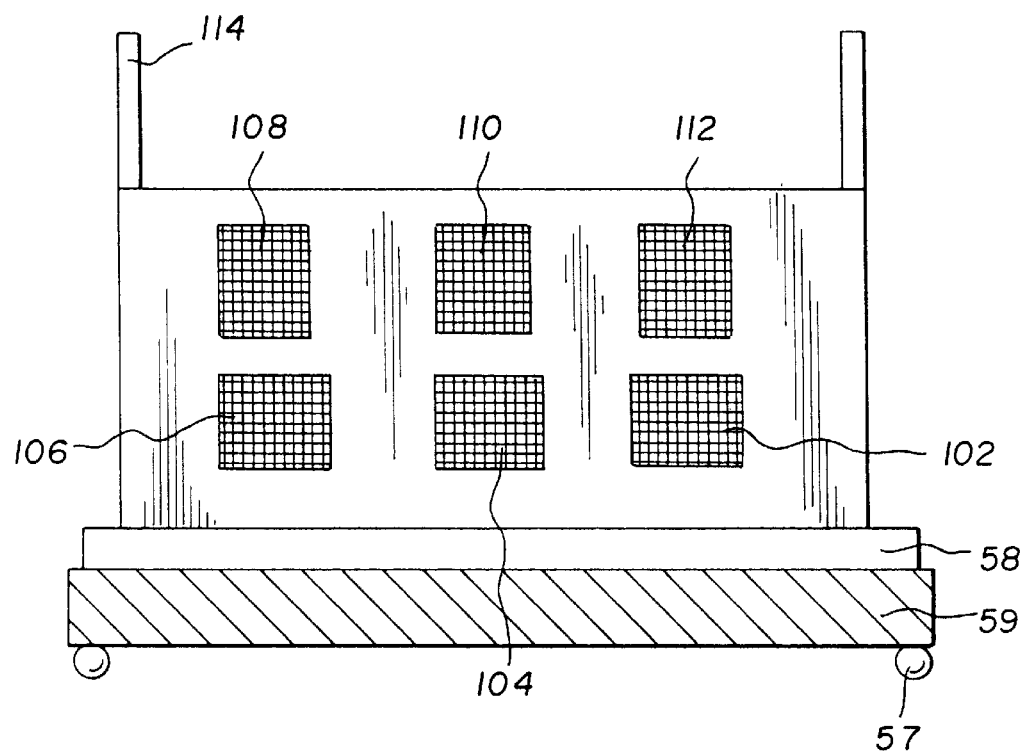
FIG. 8 shows a multiple rail arrangement for switching between portrait and landscape positioned spatial light modulators where there are three distinct spatial light modulators for color sequential illumination.

An effort to combine multiple LCD printing schemes is shown in FIG. 8, which is an assembly with vertical motion to switch between portrait 108, 110, 112 and landscape 102, 104, 106 LCDs and a lateral assembly to switch between LCD colors red 106,108, blue 104, 110, and green 102 112. The vertical assembly uses a rail 114 to move the mounting plane. Dither assembly 58 is attached at the rear of the device and at the bottom of the mounting plane. A lateral assembly using rollers or ball bearings 57 is the base or rail system 59 of the entire assembly.

Figure 9:
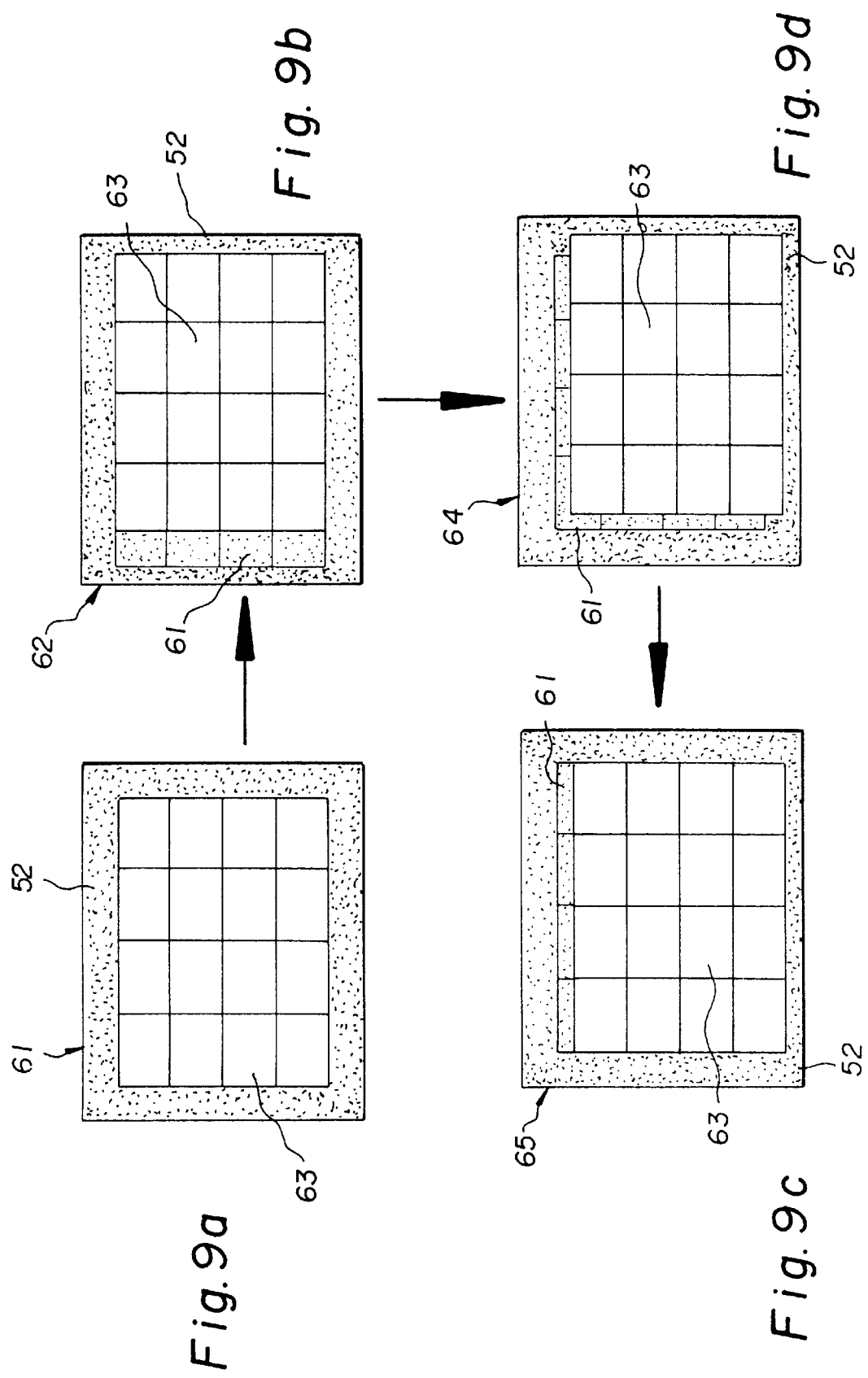
FIG. 9a–9d illustrate the effect of dithering an un-apertured spatial light modulator using four distinct image positions.

In a further embodiment of the photographic printing system, a single LCD may be used to increase resolution. One of the issues when printing with a two-dimensional modulator is the effect of modulator site defects. Another possible issue is a need to increase resolution for larger print sizes. Both these issues can be addressed through dithered printing. Dithering a standard high aperture ratio LCD modulator 52 is shown in FIGS. 9a–9d. To dither a full aperture LCD is to image the modulator 52 at one position, and reposition modulator 52 a fraction of a modulator site distance away and image. In so doing, multiple images are created and overlapped. By overlapping multiple images, the system acquires a redundancy that corrects for modulator site failure or drop out. Furthermore, by interpolating and updating the data between positions, the effective resolution is increased. One particular dithering scheme is depicted in FIGS. 9a–9d. First, modulator 52 is positioned at a given position 61 and modulator sites 63 are positioned and imaged (FIG. 9a). Modulator 52 is then moved to a second position 62 (FIG. 9b) one half of a modulator site laterally displaced from previous position 61. Modulator 52 is then imaged at position 62. Modulator 52 is then displaced one half of a modulator site longitudinally from previous position 62, which means it is diagonally displaced from initial position 61. Modulator sites 63 are illuminated and the media exposed again. Modulator 52 is then moved to a fourth position 65 that is laterally displaced from third position 64. The media is then exposed at this position. Effectively, there is a four times increase in the amount of data written. This serves to increase image resolution and provide means to further sharpen images. With a high aperture ratio, it may be sufficient to simply dither in one diagonal direction to achieve comparable results.

Dithering requires motion of the modulator in two directions. Each motion is approximately between 5 um and 20 um for a typical reflective LCD modulator. In order to achieve this motion, many different actuator or motion assemblies can be employed. For example, the assembly can use two piezo-electric actuators. Whatever method is employed, the assembly must accommodate the actuators with the modulator. An example of the inclusion of actuators is shown in FIG. 5b. The back of the LCD mount contains mountings to mate to the motion controllers to be used in dithering.

Figure 10:
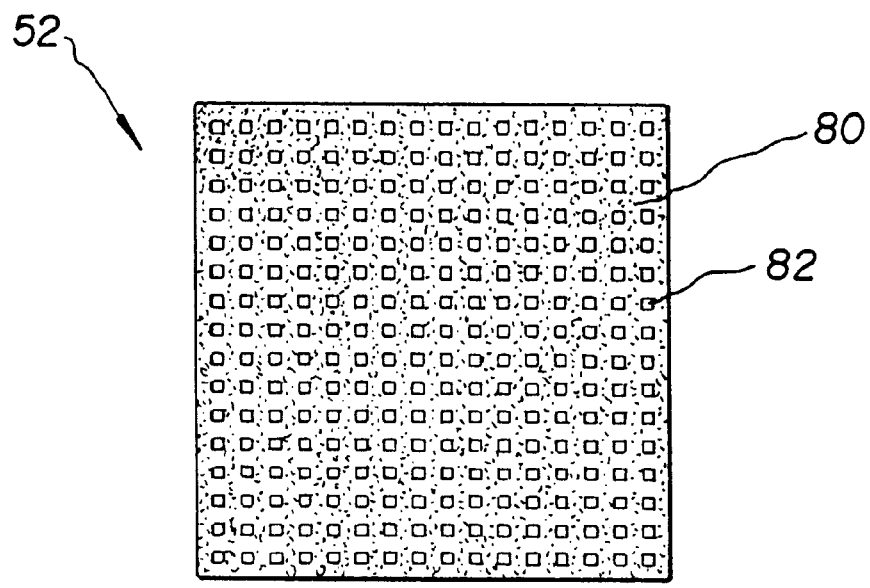
FIG. 10 illustrates a front surface of a sub-apertured spatial light modulator.

In an alternate embodiment requiring minimum modification to a reflective LCD device designed for projection display, the device can be sub-apertured. In an effort to markedly increase resolution, the modulator can contain an aperture ratio that is relatively small. Ideally this aperture must be symmetrically placed within each modulator site. The result is a modulator site for which only a fraction of the area transmits light. FIG. 10 is an illustration of a sub-apertured area modulator. Black regions 80 represent the non reflecting, non-transmitting regions of the device. Clear areas 82 represent the sub-apertured transmitting areas of the LCD.

Figure 11:
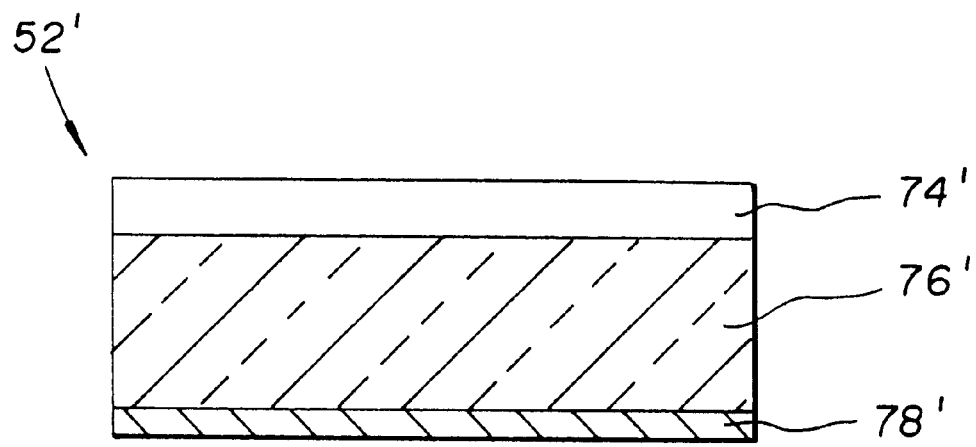
FIG. 11 illustrates a cross section of a reflective spatial light modulator.
Figure 12:
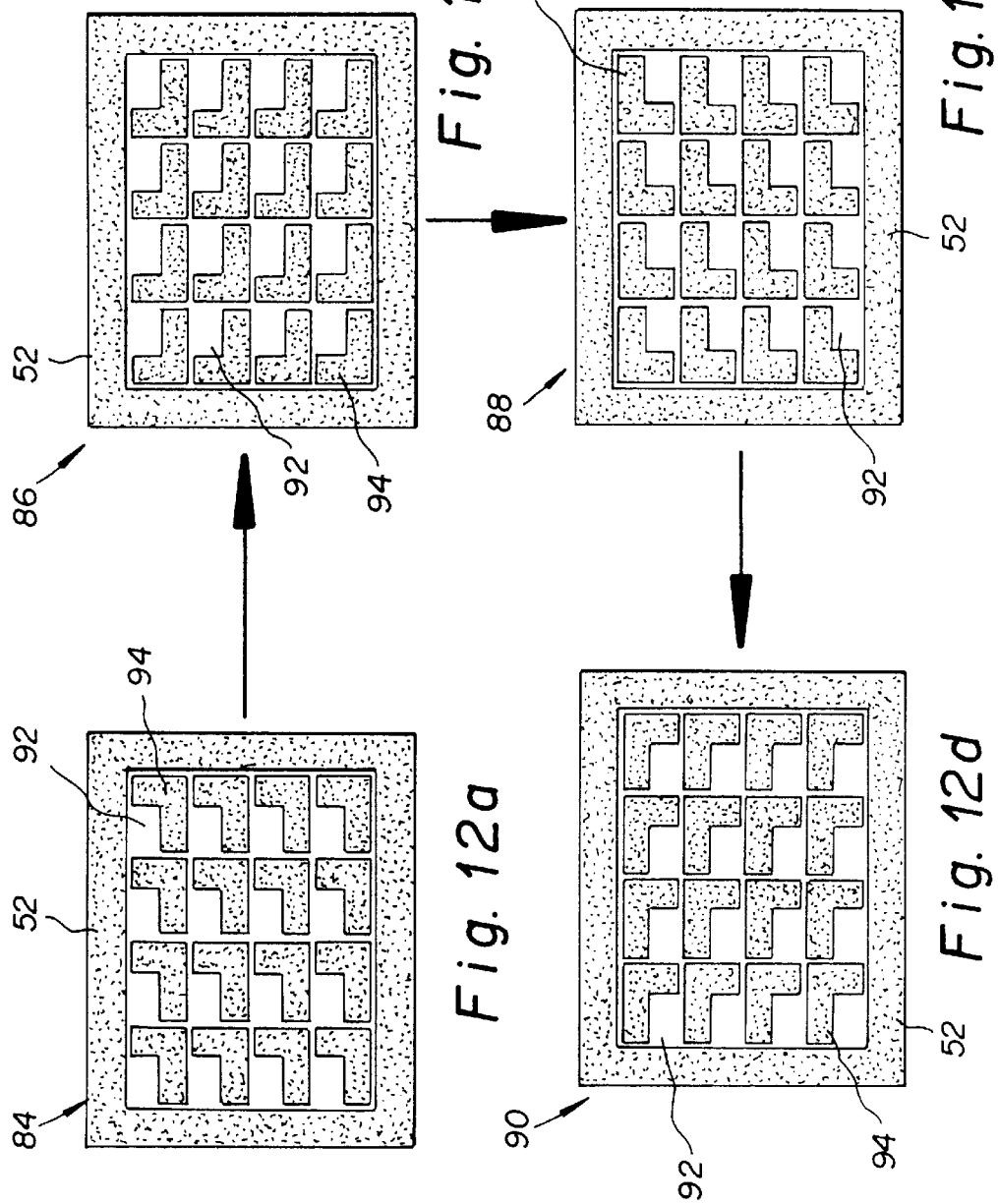
FIG. 12a–12d illustrate the effect of dithering an apertured spatial light modulator using four distinct image positions.

FIG. 11 is a cross-section of a two-dimensional LCD modulator 52'. There is a frame 78' which can be in the form of a CMOS backplane on top of which rests an LCD 76'. Above the LCD 76' is a cover glass 74'. Sub-apertures may exist as a mask in frame 78', as a pattern in LCD 76', or as a pattern on the surface of cover glass 74' closest to LCD 76'. In an effort to double the resolution in each direction, a sub-aperture of approximately 25% may be employed. By dithering a 25% aperture ratio device, it is possible to double the resolution in the image.

FIGS. 12a–12d represent the dithering of a sub-apertured device. Modulator 52 is positioned at a given position 84 (FIG. 12a) and sub-apertured modulator sites 92 are positioned and exposed while darkened (non reflecting regions) 94 are not imaged onto media 160. Modulator 52 is moved to a second position 86 (FIG. 12b) a half full modulator site (sub-aperture and surrounding non-reflective area) laterally displaced from previous position 84. Modulator 52 is then exposed at position 84. Modulator 52 is then displaced a half a full modulator site longitudinally from previous position 86 to position 88 (FIG. 12c), which means it is diagonally displaced from initial position 84. Modulator 52 is then illuminated and the media exposed again. Modulator 52 is then moved to a fourth position 90 (FIG. 12d) that is laterally displaced from third position 88. The media is exposed at this position. Effectively, there is a four times increase in the amount of data written. This serves to increase image resolution and provide means to further sharpen images.

A sub-aperture of 25% by area will give the highest image quality for a four step dither, however, in an effort to allow for redundancy in the modulator sites, it is better to use a sub-aperture ratio of greater than 25% by area.

When the sub-apertures are not placed symmetrically within each cell, dithering becomes quite difficult. Different periods of motion can be employed, for instance 1 full modulator site width lateral motion combined with and half a modulator site vertical motion makes a dither pattern. However, such motion is quite prone to image artifacts. A simple way to get around this problem is to dither using only odd columns, then repeat the dither using only even columns. Alternately, the user may dither even rows, then dither odd rows.

Figure 13:
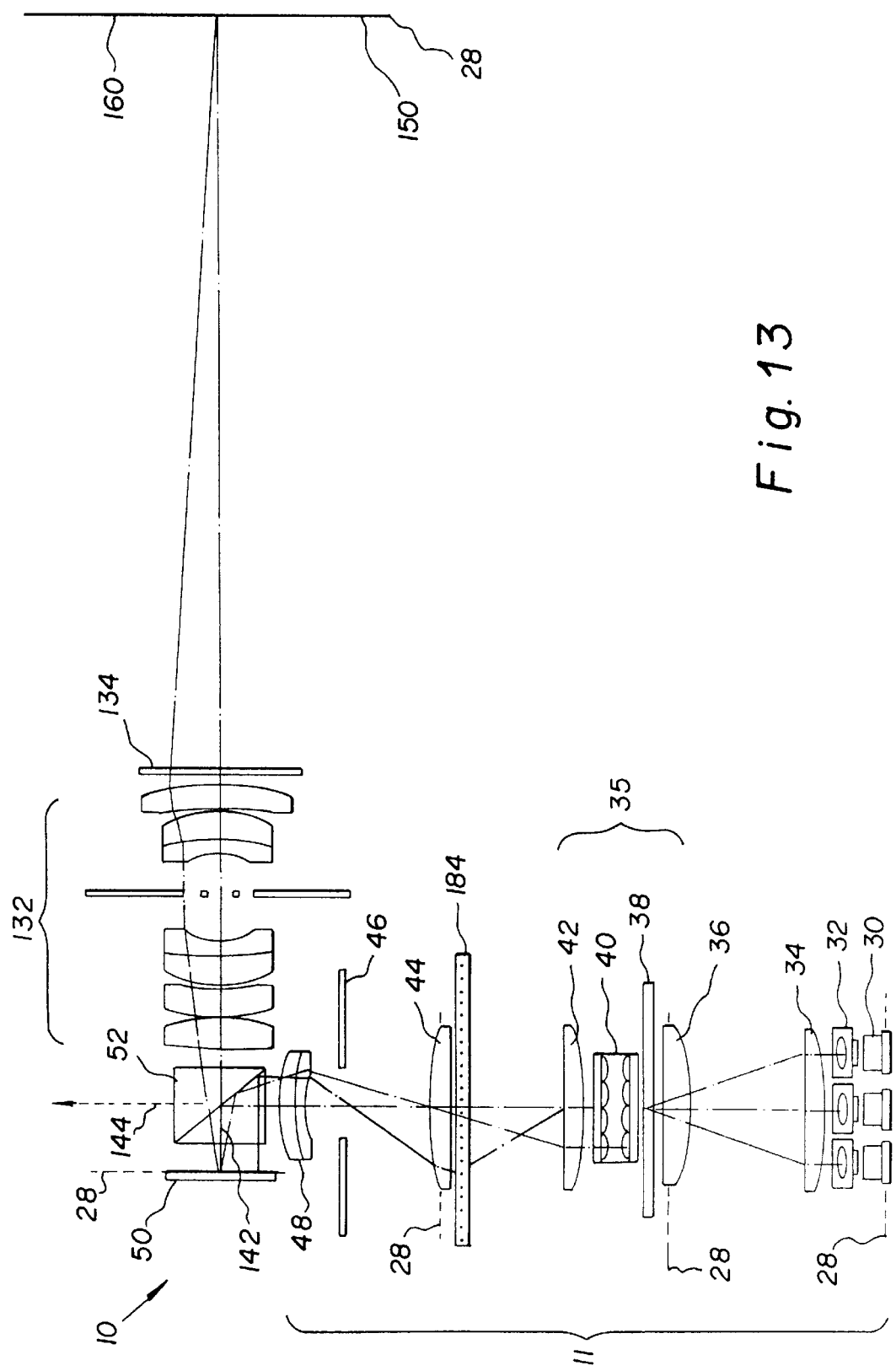
FIG. 13 illustrates a layout of a reflective spatial light modulator based printing system for printing two-dimensional swaths including an intermediate image plane for inclusion of a dither mask.

In an alternate embodiment, modulator 52 is left un-dithered. But, dithering takes place in one of the previously mentioned conjugate image planes 28 as is seen in FIG. 13. In this conjugate plane 28 a mask 184 containing the sub-aperture is placed. It is then mask 184 that is dithered while the information content to the modulator sites at modulator 52 is updated. This allows a sub-apertured image to be recorded although the device may not be sub-apertured. It is also possible to create an intermediate image plane, however, this will prove cumbersome.

Another means by which to accomplish the dithering through the use of mask 184 is to place mask 184 in the image plane immediately before media 160. This mask 184 can then be dithered while data is refreshed to the device between dither positions. This method of dither will accomplish the same effect as the previous method of the intermediate image.

In all cases involving dithering, it is best to move modulator 52 or mask 184 to a position, expose sequentially in all three colors then move to the next position. In this manner, the number of physical motions is reduced.

Following modulator 52 and beamsplitter element 50 in FIG. 1 is a print lens assembly 132. Lens assembly 132 provides the correct magnification of the image of modulator 52 to image plane 150 where media 160 is located.

Print lens assembly 132 is designed to provide magnification relating to a given image size at image plane 150. In a fourth embodiment it is possible for the printing system to create images corresponding to different print sizes. For instance, some prints may be 4 in. by 6 in. while others may be 8 in by 10 in. To switch between print sizes, the printlens assembly 132 must be changed. Ideally, the illumination and modulator assemblies remain unaltered and a different print lens assembly 132 is positioned.

Once imaged at image plane 150, the printer moves the media to a next position and the next image is recorded. It is possible to move the media to the next position and record the next image, where the next image is a continuation in space of the original image. Thereby, creating a final image that is a juxtaposition of two images.

One of the aspects which governs this printing system and is applicable to all embodiments is the means used to achieve sufficient uniformity while retaining the gray scale. Modulator 52 alone can receive up to 8 bits of bit depth. However, 8 bits to the modulator may not translate to 8 bits at the media. To print an adequate gray scale, additional bit depth must be provided. Furthermore, LCD modulators are known to have some measure of roll-off or loss of contrast at the edges of the device. To address both these issues, the print system takes advantage of the fact that modulators designed for projection display generally refresh data faster then is required for printing. Consequently, it is possible to create a single image at the media as a super-position of a series of images. The individual images that comprise the final image vary both in information content and illumination.

First, every image is broken into the three basic color components. Information corresponding to the red content of the image is displayed on the modulator. Within each color, multiple frames of image data are displayed on the modulator. Once an acceptable frame is displayed on the modulator, the first illumination pulse is employed. Following the recording of the initial frame of data, a subsequent frame is displayed on the modulator. The illumination level of the subsequent frame is altered according to the density requirements at the media. Similarly, as many frames as may be needed are introduced at the modulator and imaged at the media with the illumination adjusted accordingly. It is possible to maintain the same image data at the modulator and by altering the illumination level alone, introduce additional bit depth. By varying the illumination level, (and/or duration), and by altering the information content, the system can build a composite image out of a series of preliminary images. The superposition of the images in a given color of varied information content and varied illumination level introduces additional bit depth to the composite image. Once a given color is printed the same procedure is repeated with the data and illumination corresponding to the next color.

In many cases, the first frame of new data may display some history or residual information from the preceding data. If this is the case, that frame of data is not illuminated immediately, rather, it is refreshed and then illuminated.

The second concern in the imaging system is to correct non-uniformities in the print. The exposure system can correct for some uniformities such as roll-off at the modulator edges. One way to accomplish this is to introduce additional image data to the modulator activating only the edge modulator sites. These images are exposed and superimposed on the other images thus giving additional depth to the edge regions. An example method would be to scan a series of images taken at LCD modulator 52, create data maps and convolve all input data with an initial map of LCD modulator 52 to correct the image. Similar techniques can be used to adjust for modulator non-uniformities that are known prior to operation.

Because of the digital addressability of the LCD device and the pulsed LED illumination method of illumination, this approach to printing provides an adequate bit depth and reasonable timing for use in a photographic printer.

The advantages of this invention are the ability to use commodity technology to produce low cost, high resolution prints, without reciprocity failure.

The use of reflective liquid crystal technology in conjunction with color sequential illumination allows for very high resolution two-dimensional printing. Furthermore, the use of dithering, particularly sub-apertured dithering provides means to further increase the resolution and avoid artifacts due to modulator site failure. The timing associated with polarization based devices also allows sufficient time in printing to avoid reciprocity failure.

The invention has been described in detail with particular reference to certain preferred embodiments thereof, but it will be understood that variations and modifications can be effected within the scope of the invention as described above, and as described by the appended claims, by a person of ordinary skill in the art without departing from the scope of the invention.

PARTS LIST 10 photographic printer
11 illumination optics
12 lamps
14 red Light emitting diodes
16 green light emitting diodes
18 blue light emitting diodes
19 frame
20 circular aperture
21 spherical surface
22 anode
24 diode
25 printed circuit board
26 disk assembly
28 conjugate planes
29 halogen lamp
30 light source
31 IR rejecting filter
32 collimating lens
33 filter wheel
34 combiner field lens
35 integrater assembly
36 field lens
37 lens
38 linear polarizer
40 lenslet array assembly
40a lenslet array
40b lenslet array
42 field lens
44 field lens
46 aperture stop
48 relay lens
49 compound lens
50 polarization beamsplitter element
52 reflective spatial light LCD modulator
52' LCD modulator
53 individual modulator site
54 LCD modulator 55 LCD modulator
56 LCD modulator
57 bearings
58 mount or dither assembly
59 linear translation rail system
61 modulator position
62 modulator position
63 modulator sites
64 modulator position
65 modulator position
66 stops
70 actuator
72 actuator
74 cover glass
74' cover glass
76 polarization compensator
76' LCD
78 frame
78' frame
80 black regions
82 clear areas
84 modulator position
86 modulator position
88 modulator position
90 modulator position
92 modulator sites
94 non-reflecting region
96 portrait position of (LCD) spatial light modulator
98 landscape position of (LCD) spatial light modulator
102 landscape positioned spatial light modulator
104 landscape positioned spatial light modulator
106 landscape positioned spatial light modulator
108 portrait positioned spatial light modulator
110 portrait positioned spatial light modulator
112 portrait positioned spatial light modulator
114 rail
132 print lens assembly
134 polarizer
142 s-polarization state of light
144 p-polarization state of light
150 image plane
160 light sensitive media
184 mask

What is claimed is:

1. A method of printing two-dimensional swaths of area onto a photosensitive media using at least one reflective liquid crystal spatial light modulator, the method comprising the steps of:
    imaging light from a light source comprising an array of light emitting diodes, wherein said light emitting diodes operate at said three or more wavelengths;
    providing said imaging light for a period of time which matches a media sensitivity to produce a proper exposure;
    sequentially illuminating an optics assembly comprising a first lenslet array, and a second lenslet array, which provide uniform illumination at a conjugate plane;
    passing said light from said optics assembly through a polarization beamsplitter element to isolate polarization states of said light;
    directing said polarized light to said spatial light modulator located at said conjugate image plane to create telecentric illumination at the spatial light modulator;
    providing image data to said spatial light modulator for a period of time which matches said media sensitivity; and
    imaging said light through a print lens assembly at the photosensitive media.

2. A method according to claim 1, wherein said spatial light modulator includes a plurality of modulator sites, said modulator sites being adapted to rotate a polarization state of incident light, and reflect said light through said spatial light modulator and back to said polarization beamsplitter element.

3. A method according to claim 2, comprising the further step of:
    moving the spatial light modulator by an amount based on a size of an individual modulator site; and
    imaging said photosensitive media with new image data.

4. A method according to claim 3, wherein each modulator site of said plurality of modulator sites is sub-apertured.

5. A method according to claim 1, comprising the further steps of:
    exposing the photosensitive media in a color sequential manner with a two-dimensional color image; and
    moving said photosensitive media to a further position to print a new image.

6. A method according to claim 1, comprising the further step of:
    providing a plurality of said spatial light modulators which each represent a different color.

7. A method according to claim 6, wherein said spatial light modulator is mounted on a frame which is movable in at least two directions.

8. A method according to claim 1, comprising the further step of passing said light through a first polarization element located upstream of said beamsplitter polarization element.

9. A method according to claim 8, comprising the further step of passing said light through a second polarization element located downstream of said beamsplitter polarization element.

10. A method according to claim 1, comprising the further step of printing multiple images at the same location within each color.

11. A method according to claim 1, comprising the further step of varying a back plane voltage of said spatial light modulator for each color.

12. A method according to claim 1, comprising the further step of varying a duration of exposure time within each color.

13. A method according to claim 1, comprising the further step of varying image data within each color.

14. A method according to claim 1, comprising the further steps of:
    creating an image by exposing said photosensitive media;
    repositioning said photosensitive media; and
    exposing said photosensitive media.

15. A method as in claim 1 comprising the further steps of:
    exposing said photosensitive media with first image data for each color at a position; and
    exposing said photosensitive media with second image data for each color at said position.

16. A method according to claim 1, comprising the further step of:
    replacing said at least one spatial light modulator at said conjugate image plane with a second spatial light modulator.

17. A method according to claim 16, wherein said second spatial light modulator has an aspect ratio different from said at least one spatial light modulator.

18. A method according to claim 1, comprising the further steps of:

turning said light emitting diodes off;

allowing residual image information to decay;

turning said light emitting diodes on; and printing an additional two-dimensional swath.

19. A printing assembly which prints two-dimensional swaths of area onto a photosensitive media, the printing assembly comprising:

a light source comprising an array of light emitting diodes;

a double sided lenslet array assembly comprising a first lenslet array, and a second lenslet array, which provides uniform illumination at a conjugate plane;

a beamsplitter element which images one polarization state of light at a conjugate plane;

a reflective liquid crystal device spatial light modulator at said conjugate plane, wherein telecentric illumination is created at said reflective liquid crystal device spatial light modulator;

a print lens assembly which images said light onto the photosensitive media; and wherein imaging light from said light sources is provided for a period of time which matches a media sensitivity of said photosensitive media to produce a proper exposure.

20. A printing assembly according to claim 19, wherein said spatial light modulator comprises modulator sites which are adapted to rotate a polarization state of incident light and reflect the light through the spatial light modulator and back to the beamsplitter element.

21. A printing assembly according to claim 20, wherein said spatial light modulator is mounted on a movable frame so as to be movable in at least two directions, said spatial light modulator being movable to multiple distinct locations by an amount based on a size of an individual modulator site to create multiple images.

22. A printing assembly according to claim 19, further comprising a plurality of said spatial light modulators which each represent a different color.

23. A printing assembly according to claim 19, further comprising a first polarization element located upstream of said beamsplitter element.

24. A printing assembly according to claim 23, further comprising a second polarization element located downstream of said beamsplitter element.

25. A printing assembly according to claim 19, wherein said print lens provides a magnified image on said photosensitive media.

26. A printing assembly according to claim 19, further comprising a mask placed at an image plane, said mask being movable in at least two directions.

27. A printing assembly according to claim 19, further comprising a mask placed at a conjugate image plane, said mask being movable in at least two directions.

28. A printing assembly according to claim 19 wherein said array of light emitting diodes emits light at three or more wavelengths.

29. A printing assembly according to claim 28, wherein said light emitting diodes are operable in a color sequential manner.

30. A method of printing two-dimensional swaths of area onto a photosensitive media using at least one reflective liquid crystal spatial light modulator, the method comprising the steps of:

imaging light from a light source comprising an array of light emitting diodes, wherein said light emitting diodes operate at three or more wavelengths;

sequentially illuminating an optics assembly comprising a first lenslet array, and a second lenslet array, which provide uniform illumination at a conjugate plane;

passing said light from said optics assembly through a polarization beamsplitter element to isolate polarization states of said light;

directing said polarized light to said spatial light modulator located at said conjugate image plane to create telecentric illumination at the spatial light modulator;

imaging said light through a print lens assembly at the photosensitive media; and varying a back plane voltage of said spatial light modulator for each of said wavelength.

31. A method of printing two-dimensional swaths of area onto a photosensitive media using at least one reflective liquid crystal spatial light modulator, the method comprising the steps of:

imaging light from a light source comprising an array of light emitting diodes, wherein said light emitting diodes operate at three or more wavelengths;

sequentially illuminating an optics assembly comprising a first lenslet array, and a second lenslet array, which provide uniform illumination at a conjugate plane;

passing said light from said optics assembly through a polarization beamsplitter element to isolate polarization states of said light;

directing said polarized light to said spatial light modulator located at said conjugate image plane to create telecentric illumination at the spatial light modulator;

imaging said light through a print lens assembly at the photosensitive media;

turning said light emitting diodes off;

allowing residual image information to decay;

turning said light emitting diodes on; and printing an additional two-dimensional swath.

* * * * *